Oct. 2, 1956   S. L. WHITED   2,764,927
LAWN TRIMMER
Filed Jan. 22, 1954
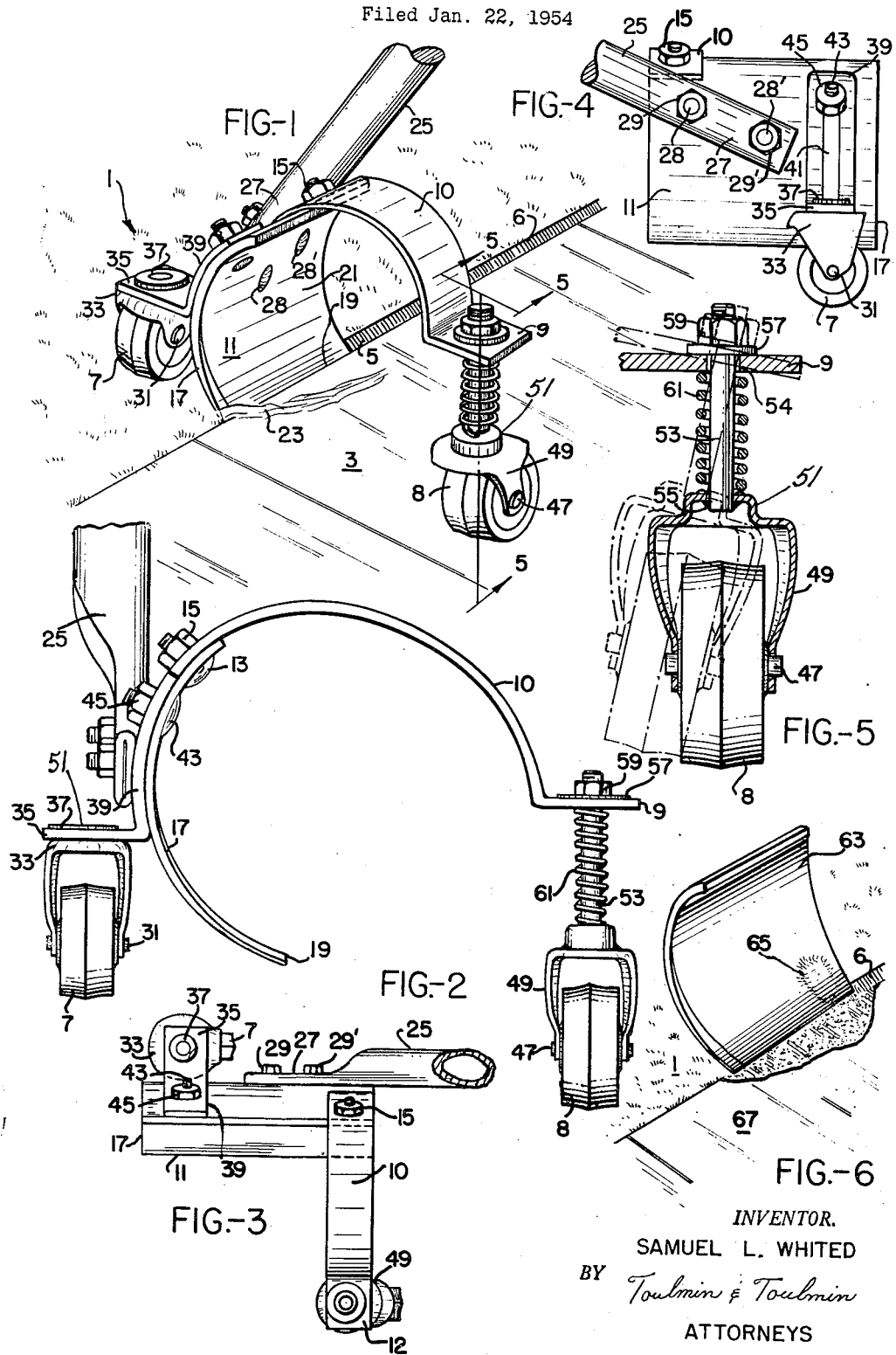
INVENTOR.
SAMUEL L. WHITED
BY Toulmin & Toulmin
ATTORNEYS United States Patent Office 2,764,927
Patented Oct. 2, 1956

2,764,927
LAWN TRIMMER
Samuel L. Whited, Springfield, Ohio
Application January 22, 1954, Serial No. 405,530
5 Claims. (Cl. 97—227)

This invention relates to lawn edge trimmers.

The invention particularly contemplates the provision of a lawn edge trimmer which in its operation removes the earth, grass, turf, leaves and similar material from the ground adjacent a curbing and the like and causes the trimmed matter to be deposited over the curbing. For example, where the curbing is a sidewalk edge the matter will be deposited on the sidewalk leaving a substantially clean furrow behind the trimmer and substantially none of the cut material on the lawn.

An important object of the invention is to provide a lawn edge trimmer wherein the above noted function is attained and the trimmer is simultaneously guided by the curbing or other similar boundary of the lawn edge.

It is a principal object of the invention to provide a lawn edge trimmer in which the cutting member is resiliently supported and the depth to which the cutting member enters the soil is controlled by the relationship between the member and a supporting wheel-carrying structure.

These and other allied objectives of the invention will become more apparent from the following detailed description and accompanying drawing wherein a preferred embodiment of the invention is set forth by way of illustration and not by way of limitation.

In the drawing:

Figure 1 is a perspective view illustrating the use of the device of invention in one position thereof;

Figure 2 is a front elevational view of the device of invention in another position thereof;

Figure 3 is a plan view of the structure of Figure 1;

Figure 4 is a left side elevational view of the structure of Figure 1;

Figure 5 is a view partially in section illustrating a novel wheel arrangement of the invention; and Figure 6 is a perspective view of a further embodiment of the invention illustrating an improvement of a portion of the structure of Figure 1.

Referring to the drawing there is indicated at 1 in Figure 1 a lawn having a sidewalk 3 bordering the same and the walk is provided with an edge or curbing 5, adjacent which a furrow 6 is formed by the trimmer as shown.

A wheel 7 rests on the lawn 1 and the trimmer straddles the curbing 5 and a second wheel 8 rests on the walk 3. Supported by the wheel 8 is an extension 9 of an arched bridging arm 10 which consists of a flat piece of metal having a degree of resiliency and which is extensible laterally under stress. The arm 10 adjacent the inner end thereof is downwardly curved and engaged with this curved portion is a depending concavo-convex plate-like member 11. A carriage bolt 13 (Figure 2) threaded to receive nut 15 passes through aligned apertures in the curved portion of the arm and the plate member 11 and secures these components fixedly together.

The wheel 7 is also secured to the concavo-convex member 11 forwardly of the arm 10 as more particularly described hereinafter. The concavo-convex member 11 is provided with a forward vertically extending arcuate cutting edge 17, the plate member 11 being suitably sharpened at the edge to provide the cutting portion. It is only necessary that the lower portion of the edge 17 be so sharpened, but if desired the whole of the forward edge may be so provided.

Extending rearwardly from the cutting edge 17 at the lower end portion thereof and on a level therewith is a free edge 19 of the member 11 shown in Figure 1 as engaging the curbing 5 at a point below the level of the sidewalk 3. This edge 19 extends rectilinearly rearwardly beneath the arm 10 and is arranged to be guided against the curbing 5 when the trimmer is in operation.

The inner concave surface 21 of the member 11 extends upwardly from the free edge 19 and rearwardly from the cutting edge 17 and earth, soil or other matter 23 cut by the edge 17 in the forward traverse of the trimmer passes over the cutting edge partially onto the surface 21 and is caused by the curvature thereof to pass over the free edge 19 onto the walk 3. With the free edge 19 held closely against the curbing 5 substantially all of the soil, grass and so forth will, under normal conditions, pass onto the walk.

A handle preferably in the form of a tubular steel rod rises upwardly and rearwardly from the member 11 as shown at 25 and the lower end of the rod is flattened as at 27 (Figure 4) and securely fixed to the member 11; aligned apertures are provided in the flattened portion 27 and the member 11 for the passage therethrough of bolts 28, 28' and nuts 29, 29' to effect the securing of the components together. The handle 25 may extend rearwardly in any suitable angle with the horizontal, usually at about 30 degrees thereto.

Wheel 7 is mounted in a wheel-carrying structure secured to the member 11; the wheel which is preferably of steel or rubber is rotatably mounted upon pin 31 the ends of which are secured in the depending skirts of frame 33; the upper side of frame 33 is apertured and an apertured toe portion 35 of an angle iron overlies the same. An apertured disc 37 is mounted atop the toe portion and the three are rigidly secured together by a weld material engaging the three components at the sides of the apertures and passing therethrough.

The upwardly extending arm portion 39 of the angle iron is shaped to conform to the curvature of the outer side of the member 11 and is provided with a slot 41 (Figure 4) which slot receives therein bolt 43 to which nut 45 is threaded, the bolt 43 passing through a bolt hole in the member 11.

Loosening of the nut 45 permits the arm portion 39 and consequently the wheel 7 to be slid upwardly or downwardly on the outer surface of the member 11. Wheel 7 is then adjustably movable to permit it to engage flat or terraced lawns, and when the bolt 45 is secured in position the wheel 7 is rigidly positioned with respect to member 11. Thus, as shown in Figure 2, the level of the wheel 7 may be above that of the wheel 8.

Also with respect to wheel 7 it is to be noted that it is, when in operation, fixedly positioned laterally with respect to the member 11 and is on the same convex side of the member 11 as the handle and when the handle is urged forwardly the movement of wheel 7 and the force on the handle normally tend to urge the free edge 19 into secure engagement with the edge of the walk as shown in Figure 1.

Wheel 8 which similarly to wheel 7 may be of rubber or steel is, as shown in the drawing, mounted for rotation on pin 47 which pin is fixedly secured in the depending skirts of frame 49. Frame 49 (Figure 5) is provided with an upwardly extending boss 51 which is apertured centrally to receive a vertical rod 53, the lower end of which passes through the boss and is securely welded to the under side of the same at 55. The upper end of rod 53 passes through an enlarged aperture 54 in the portion 9 of the transverse bridging arm 10 and the rod is provided with a loosely engaging washer 57 and is threaded at the upper end to receive nut 59 thereon.

Positioned between the extension portion 9 and the boss 51 and resiliently supporting the portion 9 and arm 10 is a compression spring 61 which normally retains the transverse arm 10 and the wheel 8 in the position shown in Figure 1, the arm portion 9 being urged into engagement with the spring by nut 59. The wheel 8, frame 49 and rod 53 are rigidly secured together and are mounted for free rotation as a unit, the rod 53 carrying the nut 59 therewith in the rotation.

Also the rod 53 is freely positioned through the aperture 54 of the portion 9 thus permitting the rod to be urged laterally by stress in arm 9 and to be canted against the aperture wall to assume positions other than the perpendicular shown in Figure 1. When so canted the nut 59 and washer 57 move downwardly and the arm portion 9 is resiliently urged against the spring 61. This arrangement permits the height of the member 11 to which the arm portion 9 and the arched arm 10 are secured to automatically adjust itself under pressure from the handle or when unexpected obstacles are encountered in the course of cutting. The rod 53 is preferably so arranged in enlarged aperture 54 that the rod may assume an angle as much as about 20 degrees with respect to the vertical in any vertical plane.

Thus the wheel 8 since it is fixedly secured with respect to the swivelable rod 9 may traverse a complete circle about the normally perpendicular axis of the rod 53. Further, the wheel 8 may move upwardly with rod 53 as the latter passes upwardly through aperture 54 against the pressure of spring 61. This flexibility permits wide latitude in the positioning of the trimmer for cutting for as shown, somewhat exaggerated for sake of clarity, in dotted line in Figure 5, movement of wheel 8 to one side sufficient to cause nut 59 and washer 57 to be pressured downwardly also occasions stress in and movement of arm portion 9 which is reflected in arched arm 10 and change in cutting depth of member 11.

Normally the soil is cut when the same is soft and the cut matter flows readily to the concave inner surface of the member 11 and onto the walk 3. The extent to which the matter flows over the surface 21 of the member 11 is dependent to some extent upon the depth of the cut as well as the condition of the soil.

The structure of the concavo-convex member 63 shown in Figure 6 includes an embossing or protuberance 65 which is preferably formed in the plate-like member by bowing-in the convex surface to provide the protuberance 65. The protuberance is effective to give impetus to the matter contacting the same to urge the matter onto the walk shown at 67.

In the operation of the trimmer pressure on the handle 25 tends to move the cutting edge forward into the turf; at the same time the pressure and fixed wheel 7 tend to urge the free edge 19 against the curbing or other bounding edge. Should an obstacle be met which tends to raise the cutting edge, such as hard earth or a stone, a slight increase of pressure on the handle urges the cutting edge downwardly and at the same time tends to flatten out the arched arm 10 to thereby cause the arm portion 9 to move transversely against rod 53, canting it, and causing the whole wheel-carrying structure to be canted since the same is rigidly secured to rod 53. This wheel-carrying structure and arm hence have a kind of knee action and since there is then very little vertical resistance by the wheel-carrying structure to the downward movement of member 11 the increased pressure is absorbed primarily in moving the member 11 downwardly into the soil.

The wheel-carrying structure which includes wheel 8 in addition to supporting the transverse arm resiliently is freely swivellable and hence accommodates itself readily to the surfaces over which it passes and is accordingly useful in the attainment of accurate guiding along a walk edge; this latter features contributes materially to the tidy furrow produced, the cut material being substantially all on the walk (Figure 1) ready for removal.

It will be understood that the structure of invention is susceptible to rearrangement and modification and it is particularly contemplated that the adjustable support of the wheel 7 (Figures 1 and 4) may be formed by providing the slot in the member 11 and extending the bolt merely through a solid piece 39, a sliding adjustability then taking place along the slot formed in the member 11.

It will be further understood that this invention is susceptible to modification in order to adapt it to different usages and conditions and, accordingly, it is desired to comprehend such modifications within this invention as may fall within the scope of the appended claims.

I claim:

1. In a lawn edge trimmer adapted to straddle a curbing bounding a lawn edge from which material is to be trimmed, the combination comprising a pair of laterally spaced wheel-carrying structures each including wheels, a concavo-convex plate-like member supported between the wheels, said member having a forward arcuate vertically extending cutting edge and a lowermost free edge extending rearwardly, rectilineally and substantially horizontally from a lowermost portion of the cutting edge, the inner surface of the member extending concavely upwardly from the free edge, a resilient laterally extensible supporting arm secured at its inner end to an upper portion of the member and extending transversely thereto over the free edge, the outer end of the arm being resiliently supported by one said wheel-carrying structure, the other said wheel-carrying structure being adjustably secured to and extending laterally of the convex side of the plate member forwardly of the arm and adjacent the forward cutting edge, and a handle extending upwardly and rearwardly from the convex side of the plate member and secured to the plate member rearwardly of the other said wheel carrying structure.

2. In a lawn edge trimmer adapted to straddle a curbing bounding a lawn edge from which material is to be trimmed, the combination comprising a pair of laterally spaced wheel-carrying structures each including wheels, a concavo-convex plate-like member between the wheels, said member having a forward arcuate vertically extending cutting edge and a lowermost, rectilineal free edge extending rearwardly and substantially horizontally from the lowermost portion of the cutting edge, the inner surface of the member extending concavely upwardly from the free edge, a supporting arm secured at an inner end to an upper portion of the member and extending transversely thereto over the free edge, the outer end of the arm and one wheel-carrying structure forming a knee-action support for the arm, the other wheel-carrying structure being secured to the member, the knee action support for the arm comprising a vertically extending rigid rod of the one wheel-carrying structure passing loosely through an enlarged aperture in the end of the supporting arm, and means resiliently supporting the arm with respect to the rod.

3. In combination, in a lawn edge trimmer, a pair of laterally spaced wheel-carrying structures, an arched arm having an outer end portion loosely engaging one of the wheel-carrying structures and being resiliently supported thereby, the wheel-carrying structure being freely swivelable with respect to the arm and the arm extending towards the other wheel-carrying structure, a concavo-convex plate-like member having a forward cutting edge and a lower free edge extending rearwardly therefrom, said member being secured to and depending from the inner end of the arm, the free edge passing transversely therebeneath, the other of the spaced wheel-carrying structures being secured to the convex side of the member.

4. In combination, in a lawn edge trimmer, a vertically depending concavo-convex plate-like member having an arcuate forward cutting edge and a lower free edge rearwardly extending from the cutting edge, a stress-transmitting arm secured to and extending transversely of the member outwardly therefrom over the free edge, spaced wheel-carrying structures on opposite sides of the member supporting the member and arm, one wheel-carrying structure being adjustably secured to said member and the other being secured to the outer portion of the arm, handle means extending upwardly and rearwardly from the member, and a protuberance adjacent the free edge of the plate-like concavo-convex member on a rearward portion thereof.

5. In combination, in a lawn edge trimmer, a pair of laterally spaced wheel-carrying structures, one said structure comprising a frame, a wheel mounted in the frame and a rod secured to the frame and extending therefrom, an arched stress-transmitting arm extending from one said wheel-carrying structure toward the other and having an end portion loosely engaging said rod at the upper end thereof, spring means around the rod between the frame and end portion of the arm engaging the same, means on the rod urging the arm into resilient engagement with the spring means, a vertically depending plate-like member secured to the other end of said arm, said plate-like member being concavo-convex in cross-section and having a forward, arcuate vertically extending cutting edge, said plate-like member supporting said other wheel-carrying structure from the convex side thereof.

References Cited in the file of this patent

UNITED STATES PATENTS

| | | |
|---|---|---|
| 191,287 | Jefferson | May 29, 1877 |
| 918,239 | Wheeler | Apr. 13, 1909 |
| 1,180,783 | Mason | Apr. 25, 1916 |
| 1,258,492 | Stansell | Mar. 5, 1918 |
| 1,374,641 | Ehne | Apr. 12, 1921 |
| 1,658,892 | Gilbert | Feb. 14, 1928 |
| 1,941,548 | Friedheim | Jan. 2, 1934 |